United States Patent [19]

Wallace

[11] 4,040,881
[45] Aug. 9, 1977

[54] METHOD OF FORMING TUFTED CUSHION ELEMENTS

[75] Inventor: Earl C. Wallace, Andrews, Ind.

[73] Assignee: General Engineering & Manufacturing Corporation, Andrews, Ind.

[21] Appl. No.: 669,307

[22] Filed: Mar. 22, 1976

[51] Int. Cl.$^2$ .............................................. B32B 7/08
[52] U.S. Cl. .......................................... 156/93; 5/356; 29/91.1; 156/213; 156/290; 156/293; 264/321; 297/456; 297/DIG. 1; 428/104; 428/159; 428/310; 428/315
[58] Field of Search ................ 156/43, 293, 212, 213, 156/290; 297/452, 456, DIG. 1; 5/356; 29/91.1; 428/104, 310, 315, 159; 264/321

[56] References Cited

U.S. PATENT DOCUMENTS

| | | | |
|---|---|---|---|
| 3,116,569 | 1/1964 | Kramer | 29/91.1 |
| 3,233,885 | 2/1966 | Propst | 297/456 |
| 3,320,108 | 5/1967 | Lande | 156/290 |
| 3,544,417 | 12/1970 | Corzine | 156/93 |
| 3,576,059 | 4/1971 | Pearson | 29/91.1 |

Primary Examiner—Edward G. Whitby
Attorney, Agent, or Firm—David H. Wilson

[57] ABSTRACT

A method of forming tufted cushion elements comprising the construction of a pattern form with open cavities of various depths and wall inclinations. A piece of facing fabric is spread over the surfaces of the open cavities with its finish face toward the pattern form, and pre-cut oversize cushion elements the unconstrained geometry of which generally conforms to the cavitiesare placed into the open cavities within the facing fabric. A unitary piece of backing fabric is laid over the pattern form and attached to the facing fabric portions exposed between cushion elements along the edges of the cavity partitions, first by an adhesive and next by a sewing operaton. A unitary piece of finished backing fabric is attached on 3 sides to the edges of the backing fabric in order to provide a means of mounting the cushion element on a seat frame.

12 Claims, 10 Drawing Figures

METHOD OF FORMING TUFTED CUSHION ELEMENTS

BACKGROUND OF THE INVENTION

1. Field of the Invention

This invention relates to methods of forming seat cushion elements, and more particularly to the formation of seat cushion elements through the utilization of patterned forms to obtain a desired geometric shape.

2. Description of the Prior Art

Past methods have utilized patterned forms to determine the shpae of the cushion element. One such method is shown in U.S. Pat. No. 3,320,108 of May 16, 1967, for "Method of Forming Tufted Cushion Elements" which issued to Bernard Z. Lande. In the Lande Patent a compression technique was utilized to force the fabric and the compressible material into the cavities of the patterned form. A slab of resilient foam was saturated through its thickness with adhesive and compresses to form a facing fabric-to-compressed foams-to-backing fabric adhesive bond along tucks in the cushion. One distinct disadvantage of such a method is that the tufts do not have well-defined contours due to the nature of the compression process. In addition, the compression process places the compressible material of the finished cushion element in a partially stressed position, thus not affording full resiliency to oppose the body weight of the seat occupant. Further, the intervening foam along the tuck lines weakens the bond of the facing fabric so that it can break loose in normal wear.

In typical quilting operations involving sewn tucks the cushioning material is sewn between the facing and backing fabric layers either in its full thickness or in some thick cushioned structures in a partial thickness. As a result the compressed cushioning material provides a working freedom or motion under use conditions between the facing and the remainder of the cushion structure which tends to break down the threads of the sewn stitching and to pull free the stitching to the fabric.

In accordance with the above, an object of the present invention is to provide an economical and uncomplicated method of forming tufted cushion elements without the use of a compression technique.

Another object of the invention is to provide well defined cushion element contours irrespective of the geometric shape or proximity of the individual cavities of the patterned form.

A third object is to minimize stress on the seams sewn between a facing and a backing between sections of a tufted cushion.

A fourth object is to enhance the cushioning achieved with a given resilient material formed into a plurality of tufted sections of cushioning by avoiding prestressing and distortion of the unloaded cushion.

SUMMARY OF THE INVENTION

The present invention is directed to a method of fabricating tufted cushions which the front facing is directly coupled to the back facing with no intervening resilient cushioning material. Individual bodies of cushioning material are enclosed in sections by the front facing and back facing to afford floating freedom of the cushion sections and minimize working of the joints between the front and back facing.

More particularly, this invention realizes the above objects through the use of a pattern from which is arranged to accommodaate cushioning units in a manner to establish the shape of the desired cushion element. A finished piece of facing fabric is placed over the entire surface of the form with its cushion facing surface against the form and tucked into an array of cavities in the form. Precut oversize cushion elements having the configuration of the cushion sections are placed into the open cavities of the pattern form, and within the pockets of facing fabric. Following this, adhesive is applied to the facing fabric overlying the outermost edges of the partitions defining the cavities of the form, and a piece of backing fabric is placed over the outer surface of the assembled elements in the form to engage the adhesive and the facing fabric overlying the partitions, there remaining in the form until the adhesive bond is established. After this step, the cushion element is removed from the pattern form, and the backing fabric is stitched to the facing fabric along the regions formerly occupied by the partitions. A unitary piece of finished backing fabric is then stitched on three sides to the backing fabric, thus finishing the cushion element and providing a means of mounting the cushion element upon a seating frame.

BRIEF DESCRIPTION OF THE DRAWINGS

Other objects and advantages of the invention will become readily apparent to those skilled in the art from reading the following detailed description of the process when considered in light of the following drawings, in which.

DESCRIPTION OF THE PREFERRED EMBODIMENT

Figure 1:
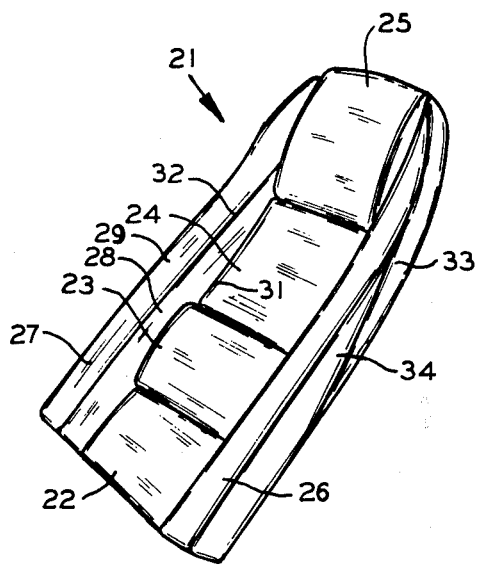
FIG. 1 is a perspective view of a finished tufted cushion element typical of the type constructed through the utilization of this invention.

A seat back topper 21 for a lumbar support chair is shown in FIG. 1 as typical of the tufted cushion elements formed according to this invention. Topper 21 is adapted to be mounted over a frame, typically of the form shown in United States Patent Application Ser. No. 631,517 entitled "Reclining Back-Rest Seating Structure" which was filed Nov. 13, 1975 in the names of Richard A. Bell, Warren M. Rider and Ted W. Winters, to provide a sculptured contour appearance to the finished seat. This contoured appearance is achieved by an array of cushion sections, typically parallelpiped inner sections 22, 23 and 24 and border sections 25 for the top and 26 and 27 for the sides. Intermediate inner section 23 is of the greatest thickness to afford lumbar support by protruding beyond the other inner sections when mounted with the rear faces against the spring support and frame of the chair back (not shown). Lower inner section 22 is somewhat thinner than section 23 yet thicker than upper inner section 24 and top border section 25. A wrap around effect is achieved for the back of the chair by employing side border sections 26 and 27 of greater thickness than the inner sections 22 and 24 and top section 25 and by dividing their front faces into two panels which are inclined as at 28 and 29 of 27 so that the longitudinal edge 31 of panel 28 contiguous with the inner sections is coplanar with the exposed major face of sections 24 and 25 and somewhat depressed relative to sections 22 and 23 while the outer longitudinal edge 32 protrudes above edge 31 to merge with panel 29.

The array of sections 22 through 27 is sufficiently flexible at the joints between sections that the frame upon which it is mounted enhances the wrap around contour by supporting side sections 26 and 27 and top section 25 outward from inner sections 22, 23 and 24 toward the occupant supporting region of the seat. Accordingly, the outer sides of side sections 26 and 27 are flared in the upper portions of the back to provide a squared side to the front of the seat as the array is cupped to fit the frame and spring support. This flared region is made up of two panels 33 and 34 angularly related to each other in the outer side face of side sections 26 and 27.

A single piece of facing fabric 35, see FIGS. 6 through 10, covers the cushion sections on the occupant support face thereof, and can be joined as by sewing to a back facing 36 of fabric to finish the topper. Where a greater thickness of cushion than is afforded by the sculptured sections 22 through 27 is desired a panel of cushioning material (not shown) can be superposed on the back of the array illustrated and a side boxing of fabric (not shown) can be applied between the front facing and back facing to accommodate the greater thickness. This augmenting thickness and boxing is advantageously utilized with heavily loaded cushion elements of the general construction described, particularly in the seat cushions of chairs and the like.

Figure 2:
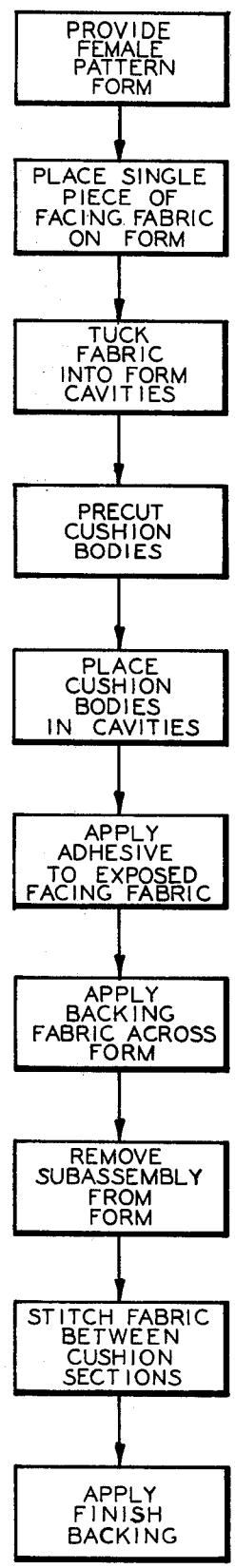
FIG. 2 is a flow chart of the sequential manipulative steps to be performed which will hereinafter be described.

The method of fabricating the topper 21 of FIG. 1 is set forth in flow diagram steps in FIG. 2. A female pattern form 37 for the cushion element is provided having an array of cavities 38, 39, 41, 43 and 44 corresponding in the spatial relationships and configurations to the cushion sections 22 ghrough 27 respectively. The form 37 is provided with partitions to define the sides of the cavities and where appropriate the bottoms of the cavities are elevated with respect to the maximum depth of the form to position the outermost edges of the partitions in a common plane. Walls of the cavities defined by the partitions are inclined to converge and an inclined bottom panel is provided for the cavities 43 and 44 accommodating side sections 26 and 27 of the cushion element. Thus, each cavity is of the configuration of the cushion section it is to accommodate and is oriented in the array to establish the relationship of the respective cushion sections desired.

Once the female pattern form is provided, the facing material for the cushion element is positioned on the form with its finished face against the form. The facing material is tucked into the cavities of the form to smoothly conform to the bottom and closely fit the partitions forming the cavity sides.

Cushion bodies are preformed to the configuration desired in the finished topper. These bodies can be of a resilient foamed elastomer such as foamed polyurathane and can be molded to shape or cut to shape. Advantageously they are slightly oversize for the cavities of the form so that they will stretch the facing material taught and will cause the finished sections to be closely fitted together when removed from the pattern. However, it is to be appreciated that the cushioning bodies should not be so oversized with respect to the cavities as to stress unduly the joint between the front and rear facings of the cushion element at the tucks between the finished sections.

The preformed cushion bodies are inserted in their respective facing fabric lined cavities in the orientation to cause them to conform to the cavity bottoms and walls. When properly seated in the cavities the cushion bodies expose lines of the back side of the front facing fabric which extend across the outermost edges of the partitions between cavities. Adhesive is applied to these exposed areas and a piece of backing fabric is placed against the subassembly and maintained until an adhesive bond is established between the front facing and this backing fabric to enclose each cushion body. While scrap fabric can be used for the backing in those instances where a finish backing panel is applied to the cushion element, in regular production the backing fabric can be furniture denim.

The topper 21 is processed further by extracting the subassembly from the female pattern form and stitching along the tucks between the cushion sections. In practice these stitches are located in registry with the portions of the subassembly which overlaid the outer edges of the cavity partitions and thus are in registry with the adhesively bonded areas between the front facing fabric and the back fabric.

Additional padding and finishing facing can be applied as required. In the case of a topper for a seat back of the type shown in FIG. 1 a pocket is formed behind the backing fabric to receive the seat back frame and its support elements which may include flat tension springs extending longitudinally and/or transversely of the frame (not shown). Advantageously, a finish backing of fabric is secured to the side margins of the cushion element subassembly as by stitching at the sides and top with its finish face positioned rearwardly outward. A thin sheet of cushioning such as a foamed elastomer sheet cut to the outline of the array of cushion sections forming the cushion element can be inserted in the pocket from the bottom and against the rear facing to cushion the rear face of the topper after it is applied to the back frame. When the topper for the back is mounted on the frame it can be secured as by hog rings at its bottom.

Figure 3:
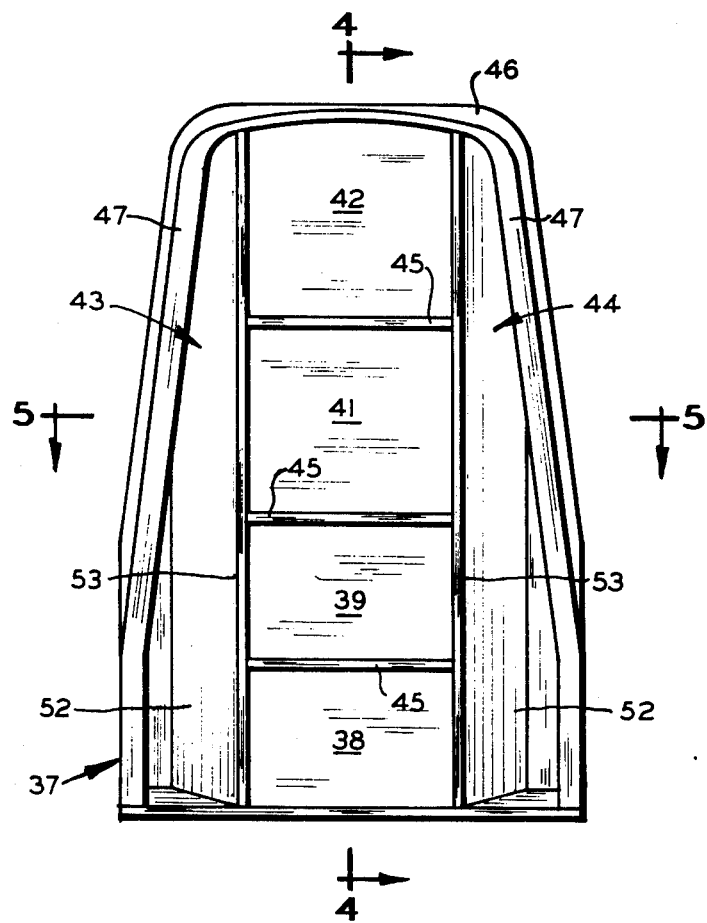
FIGS. 3, 4, and 5 constitute the top, side, and front views respectively of a typical patterned form.

As best shown in FIG. 3 this method contemplates the construction of a female pattern form 37. Pattern form 37 is comprised of pattern cavities 38, 39, 41, 42, 43 and 44 for cushion sections 22, 23, 24, 25 and 26 respectively defined by partitions 45 upstanding from a backing member 46. Plywood or any other suitable material may be used in the construction of pattern form 37.

Figure 4:
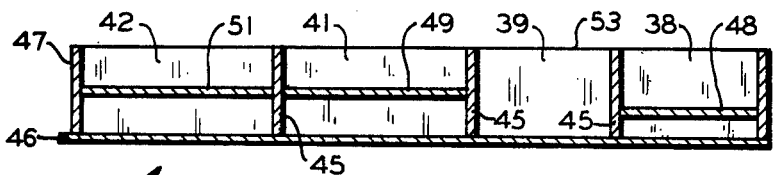
Figure 5:
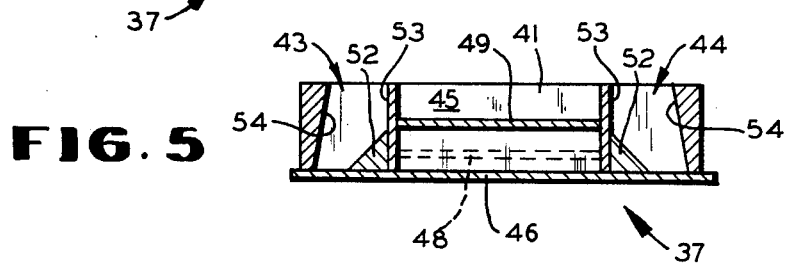

It is advantageous to construct pattern form 37 by providing marginal walls 47 upstanding from the backing to enclose the array of cushion sections and project therefrom to a uniform height. The depth of the inner cavities is determined by the thickness of the cushion bodies and their corresponding cushion sections. Thus false bottoms 48, 49 and 51 are located in cavities 38, 41 and 42 at a depth corresponding to the respective thicknesses, FIG. 4. As best seen in FIG. 5, the side cavities have converging walls including a longitudinal panel 52 which provides the tapered contour into the level of the shallowest inner cavities 41 and 42 at the partition 45 contiguous therewith and extending throughout the length of the side panels. The edges of the cushion sections 26 and 27 which abut the inner sections 22, 23, 24 and 25 are defined by panels 53 as faces of longitudinal partitions 45 perpendicular to backing member 46. The marginal walls 47 are tapered inward at 54 to accommodate the cupping of the upper portion of the topper as it assumes its wrap around form in the back frame. Thus, the side cavities have walls which converge at their greatest depth in the form and at their least depth or outer face.

Figure 6:
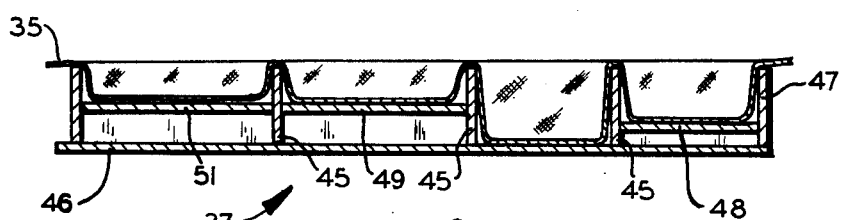
FIGS. 6 through 10 are cross-sectional views illustrating the sequential manipulative steps to be performed which will hereinafter be described.
Figure 7:
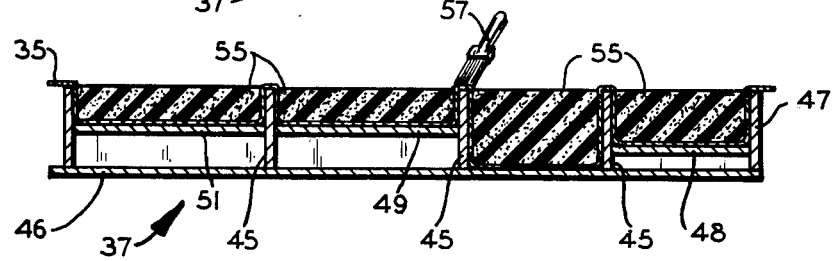
Figure 8:
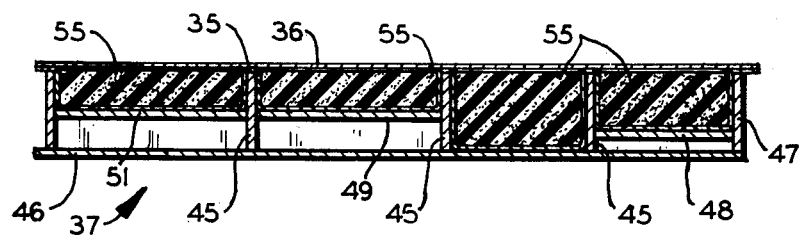

Pattern form 37 may now be placed on a work table such that the tufted cushion element can be constructed. As best shown in FIG. 6 a unitary sheet of facing fabric 35 is placed over all inner surfaces of the open cavities 38, 39, 41, 42, 43 and 44. Facing fabric 35 will thus be generally conforming to the shape of the open cavities. As shown in FIG. 7, precut, oversize cushion blocks 55 are now placed into the open cavities within pattern form 37 to force facing fabric 35 to generally conform to the shape of the individual open cavity. Cushion blocks 55 are pre-cut to the shape of the individual cavity in order to avoid the necessity to compress them to any substantial degree, and are slightly oversize such that the eventual removal of the cushion element from pattern form 37 will cause the full expansion of the individual cushion block 55 such that all slack in facing fabric 35 will be removed.

As illustrated in FIG. 6 a layer of quick-drying adhesive 56 is now applied to the back of facing fabric 35 overlying the outermost edges of partitions 45. It is advantageous to apply adhesive 56 by means of brush 57.

A unitary piece of backing fabric 36 is now placed over the top of cushion blocks 55 are as well as the adhesive covered ridges of facing fabric 35 such that backing fabric 36 is bonded to facing fabric 35. Backing fabric 36 may or may not be the same finished fabric as fabric 35, depending on whether or not the back of finished cushion element is to be exposed. In the illustrated method, backing fabric 36 is scrap fabric which is to be covered over by finished backing fabric 58.

Figure 9:
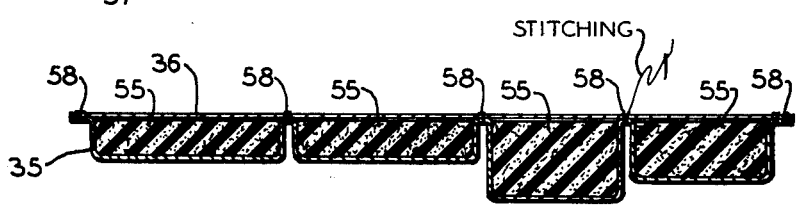

When the adhesive bond is formed, the cushion element may be removed from pattern form 37. The cushion element will have a shape conforming to the individual cavities of pattern form 37 as shown in FIG. 1. Projections in cavities of pattern form 37 will result in indentations within the cushion element, and identations in the cavities of pattern form 37 will result in projections within the cushion element. As shown in FIG. 9, backing fabric 36 is now stitched to fabric 35 at those locations where adhesive 56 was applied as at stiches 58. This gives added stability to the entire cusion element at those spaced between the individual cushion blocks 55.

Figure 10:
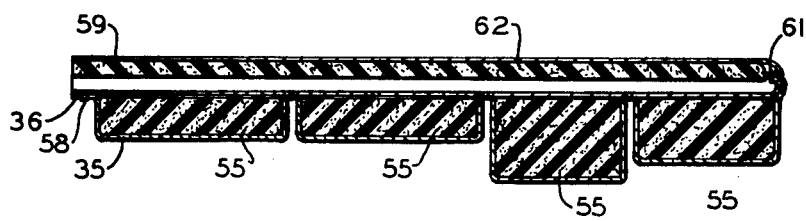

It is now advantageous to place a unitary piece of finished backing fabric 59 over backing fabric 36, and to suitably attach by means such as sewing as generally illustrated at 61 in FIG. 10. It is contemplated that the stitching should be on the top and sides of backing fabric, such that the bottom side is open. This allows the finished tufted cusion element to slip over and be attached to the seat frame by hog rings or other suitable means. A thin sheet of foam 62 is inserted against back against 59 inner face to pad the back.

The finished cushion element 21 is now trimmed to give a finished appearance, as illustrated in FIG. 1.

A significant feature of this method is that the pre-cut oversized cushion blocks in conjunction with the geometric shape of the individual open cavities, provide well defined contours for the cushion element. In addition, the cushion blocks remain in a fully expanded position at all times such that full compressibility remains in the finished cushion element.

This method is equally amenable to variations in the type of fabric as well as type of cushion blocks. The avoidance of a compression process allows a wide range of selection of all cushion materials.

One alternative of the above method would be the stitching of a unitary piece of boxing fabric to the cushion element when it is removed from pattern form 37. The boxing fabric would be sewn between the rearmost edges of facing fabric 35 and the finished backing fabric 59. This alternative would provide additional depth so as to allow padding to be attached to the seat structure frame in order that the cushion element can be "slipped over" said seat structure frame.

It is to be appreciated that the previously described method lends itself to additional variations, and hence the disclosure is to be read as illustrative rather than in a limiting sense.

What is claimed is:

1. A method of forming flexible, tufted cushion elements having an array of a plurality of contiguous sections of different thicknesses, geometric forms and sizes enclosed in a continuously flexible sheet material comprising:
   placing a first sheet of flexible material on a female pattern form having an array of cavities of different depths, geometric forms and sizes corresponding to said cushioned elements separated by partitions;
   tucking the first flexible sheet of material into the partitioned cavities of said female pattern form to conform to the walls of the form cavities;
   pre-forming bodies of resilient cushioning material of the general geometric form of said sections;
   mounting the respective bodies in the respective form cavities to overlie the first flexible sheet within said cavities and expose portions of the first flexible sheet portions extending across the exposed edges of the partitions; and
   adhesively bonding a second flexible sheet on the exposed portions of the first flexible sheet.

2. A method according to claim 1 including the step of forming the bodies of resilient cushioning material of a size slightly exceeding said respective cavity sizes whereby the flexible enclosing material is subjected to tension upon release of said bodies from said cavities.

3. A method according to claim 1 including the step of sewing the adhsively bonded regions of the first and second flexible sheets together.

4. A method according to claim 1 wherein the bonding adhesive is selectively applied to the exposed portions of the first flexible sheet portions extending across the exposed edges of the partitions.

5. A method according to claim 1 wherein said first sheet has a dress finish face including the step of placing said dress finish face against said form.

6. A method according to claim 4 including the step of sewing a third sheet of flexible material having a dress finish face to the first sheet of material along the perimeter of the array of contiguous sections.

7. A method according to claim 5 including the steps of precutting a thin sheet of cushioning material which is thin relative to the thickness of the sections of the array to the general outline confirmation of the major plane of the array; and fitting said precut sheet of cushioning material with its major face contiguous to said third sheet between said third and second sheets.

8. A method according to claim 1 including the step of providing a female pattern form having the exposed edges of the partitions between cavities in a common plane.

9. A method according to claim 8 including the step of providing surfaces of certain of the cavities intermediate the partitions which are parallel with said common plane and surfaces of certain of the cavities intermediate the partitons which are inclined with respect to said common plane.

10. A method according to claim 1 including the step of providing a female pattern form having cavities defined by partitions which are convergent from the depth of said cavities toward said free edges.

11. A method of forming tufted cushion elements comprising:

mounting partition strips upon a backing board and generally perpendicular thereto to form open cavities;

mounting panels with their major faces against the backing board within the lower extremity of said open cavities to provide various depths and inclinations to the bottoms of the cavities;

covering the inner surfaces of said open cavities with a unitary piece of facing fabric;

placing pre-cut oversize cushion blocks into said open cavities;

applying adhesive to said facing fabric at the upper ridges of said partition strips;

placing a single piece of backing fabric over said cushion blocks to engage said adhesive and to bond thereto;

stitching said backing fabric to said facing fabric at those locatons where said adhesive was applied; and stitching a unitary piece of finished backing fabric at the outward extremities of the top and sides of said backing member.

12. A method of forming tufted cushion elements according to claim 11 including the steps of stitching a unitary strip of fabric boxing to the edges of said facing fabric; and stitching a unitary piece of finished backing fabric to the edges of said fabric boxing.

* * * * *